2

United States Patent Office 3,507,810
Patented Apr. 21, 1970

3,507,810
CATALYST FOR OXIDATION OF NAPHTHALENE TO PHTHALIC ACID ANHYDRIDE
William Eugene Sanborn, Wilton, and John Francis Lindsley, Glenbrook, Conn., assignors to American Cyanamid Company, Stamford, Conn., a corporation of Maine
No Drawing. Filed May 18, 1967, Ser. No. 639,260
Int. Cl. B01j 11/82; C07c 63/02
U.S. Cl. 252—430          4 Claims

ABSTRACT OF THE DISCLOSURE

A process for making a catalyst for the oxidation of naphthalene to phthalic anhydride in which an organic flocculating agent is used to improve the distribution and quantity of components in the catalyst gel. The catalyst gel is atomized in the preparation of the finished catalyst at a particle speed sufficiently low to prevent the breakup of gel particles into excessive fines. For example, the catalyst may be prepared by the addition of a polyacrylamide to a high solids content silica xerogel-salt (potassium sulfate and vanadium oxide) slurry which is spray-dried at an atomizer speed below 12,000 revolutions per minute and a peripheral speed below 18,800 feet per minute.

BACKGROUND OF INVENTION

The conversion of naphthalene to phthalic anhydride is commercially carried out in the vapor phase over a catalytic fluid bed. Fluidization of the catalyst is maintained by the upward passage of a stream of reactant gases, such as naphthalene and air, at 0.5 to 4 feet per second, with a suitable bed height to insure an optimum reaction time. The characteristics of the fluid bed process require demanding specifications for the composition and size of the catalytic particles. The fluidized catalysts are in finely divided form, usually not more than 10% being coarser than 100 mesh, with the major portion being from 200 to 325 mesh, or finer.

Patent application Ser. No. 288,548 sets forth in detail several recent developments in the field of phthalic anhydride catalysts made from silica gels impregnated with vanadium pentoxide and potassium sulfate. This copending application outlines the considerable research efforts which have been expended to provide high surface area catalysts, suitable heat transfer characteristics, maintenance of particle fluidity, attrition resistance and high activity. However, several major difficulties still exist in the preparation and performance of these catalysts. In the formation of the xerogel-salt slurry the solids content must be kept low (typically 20-30%) to prevent settling and plugged lines, thus increasing the amount of slurry which must be handled. Additionally, spray-drying the slurry by atomization often has an adverse effect on particle size distribution. Moreover, the catalyst composition varies widely between the fine and coarse particles, which lessens the conversion of naphthalene to phthalic anhydride. The present invention is directed to overcoming these drawbacks in prior art procedures and compositions.

SUMMARY OF INVENTION

This invention relates to an improved vanadium oxide-potassium sulfate-silica base catalyst, its method of preparation and its use in the vapor phase fluid bed catalytic oxidation of naphthalene to phthalic anhydride. The addition of a flocculating agent to the silica-salt slurry results in improved handling for high solids content slurries and a more uniform composition of the catalyst particles. The adjustment of atomizer speed for formation of catalyst particles from the gel-salt slurry to a value below 12,000 r.p.m. and a peripheral speed below 18,800 f.p.m. provides a more uniform size distribution for the catalyst product. These catalyst particles have superior activity for the conversion of naphthalene to phthalic anhydride, and retain their activity for extended periods of time.

THE INVENTION

In the preparation of the catalyst of this invention, a silica gel carrier or support is precipitated from sodium or potassium silicate by the addition of sulfuric acid, in accordance with procedures generally known to those skilled in the art, cf. U.S. Patent 2,701,793. The preparation of the silica hydrogel is carried out in a manner to produce a spray-dried base material having a pore volume of 0.7 to 1.1, preferably 0.85 to 0.95, at a surface area of approximately 400 to 800 square meters per gram. The silica gel may be spray-dried in accordance with the procedure described in U.S. Patent 2,644,516.

A salt solution may be prepared by diluting caustic potash with water and dissolving vanadium pentoxide therein, followed by the addition of sulfuric acid. Then the pH of the solution is adjusted to the alkaline side by the addition of ammonia. The above procedures result in a potassium sulfate-ammonium meta-vanadate mixture to which the dried silica gel base is added to prepare the catalyst mixture of this invention. The salt solution-silica xerogel mixture is diluted to a suitable solids content which, by the addition of an organic flocculating agent, may be up to 35-40%, or higher. A slurry with such a high solids content would normally be too difficult to handle as a fluid because of rapid settling and plugged lines; this difficulty is overcome by the present invention. The amount of organic agent which is added may vary from 0.1 to 2% based on catalyst solids, but is preferably from 0.25 to 1% of the catalyst solids. An improved salt distribution in the catalyst is obtained by the use of this agent, as shown in the examples set forth below. It is believed that this advance arises from improved distribution of gel particles in the larger droplets of more viscous solution and from the action of the organic polymer in holding together gel and salts crystallized outside the gel particles during drying, until the salts can be melted and absorbed by the porous gel particles during subsequent calcination of the product. This theory is, of course, not intended to limit the scope of the present invention.

Any suitable organic flocculating agent may be used in this invention, but acrylamide polymers are preferred. Other agents include starches, gums, carboxylated celluloses and polymers such as polyvinyl alcohol. These agents have previously been used as plasticizers for extrudable catalyst compositions, which are formed into spherical particles by extrusion, slicing and melt-spraying (see U.S. Patent 3,154,603). These extruded catalysts were, of course, useful only in fixed and moving bed systems, in view of their large particle size. Therefore, it was indeed unexpected that such agents could be used to perform a different function in the formation of a fluid size catalyst particle.

The slurry of xerogel and salt solution formed by the above procedure is then spray-dried in an atomizer, which is maintained below a speed of 12,000 r.p.m., with a peripheral speed below 18,800 f.p.m. The catalyst is then activated by heating in air in a manner well-known to those in the art.

The finished catalyst is suitable for the oxidation of naphthalene with air to phthalic anhydride in a fluidized bed at reaction temperatures, as set forth in U.S. Patent 2,783,249. Phthalic anhydride is produced at temperatures from 300–450° C. using naphthalene concentrations of 1 to 3.5 mole percent in air.

The improved catalyst of this invention comprises about 3 to 10% of vanadium oxide and about 15 to 35% of a potassium sulfate supported on about 55 to 75% of a silica gel carrier, which catalyst in its freshly prepared state is characterized by a surface area of from about 125 to 350 square meters per gram, and a pore volume of from 0.5 to about 0.7 cc. per gram.

Preferably, the catalysts of this invention are characterized by from about 4 to 7% of vanadium oxide, 24 to 30% of potassium sulfate, supported on about 60 to 70% of a silica gel carrier, said catalyst in its freshly prepared state having a pore volume of from 0.55 to about 0.65 cc. per gram, and a surface area of from about 150 to about 250 square meters per gram.

A typical procedure for the preparation and use of the catalysts of the prior art follows; the modifications effected by the present invention are set forth further below.

Example 1

To 10,000 parts of water in a strike tank is added 3,180 lbs. of 40° Bé. sodium silicate solution (28.3% $SiO_2$, 8.9% $Na_2O$, containing 900 lbs. $SiO_2$) and the temperature is adjusted to 105° F. The addition of 25% sulfuric acid is begun at a controlled rate so that a pH of 8 is reached in 12 to 15 minutes. Then the agitator is turned off and the silica gel slurry is aged for 10 minutes at 110–115° C. and at a pH of from 8.0 to 8.5. After completing the aging, additional 25% sulfuric acid is added at the same rate as before until the pH reaches 3.5. Finally, additional water is added to reduce the solids concentration to about 5% so that it can be readily filtered and washed.

The slurry is filtered and washed on a rotary vacuum filter, the washing being sufficient to reduce the sodium content to 0.40 or less. The washed filter cake is then repulped and spray-dried under conditions producing an average particle size of about 100 microns and a maximum of 2% finer than 200 microns.

The resulting spray-dried silica gel or xerogel is characterized by a pore volume of 0.93 cc. per gram, a surface area of 695 square meters per gram and an attrition rate, after a one-hour test, of 19%, as determined by the procedure outlined in U.S. Patent 2,768,125.

A solution of salts is prepared by diluting 712 parts by weight of 50% potassium hydroxide with 300 parts of water, dissolving 163 parts of vanadium pentoxide in the caustic, adding 2140 parts of 25% sulfuric acid and adjusting the pH to 8 with 10 to 12% aqueous ammonia.

1,900 parts of the spray-dried silica xerogel prepared as described above (with approximately a 10% loss on ignition) is added to the salt solution and the slurry diluted to about 32% total solids concentration. After impregnation, the gel is spray-dried under conditions which leave about 10% moisture and ammonia in the catalyst.

The impregnated vanadium oxide-potassium sulfate-silica catalyst is then dried and activated by heating in air at 350 to 370° C. for 2 or more hours.

A catalyst prepared in accordance with this procedure was used in a vapor phase fluid bed oxidation conversion of naphthalene to phthalic anhydride. The process conditions were: 10 seconds contact time, 350–365° C. reaction temperature, and 2.8% by volume naphthalene concentration.

Example 2

The effects of adding a polyacrylamide flocculating agent to a feed slurry are demonstrated in Table I, in which the catalyst is prepared in accordance with the general procedure outlined above. The dry basis analyses of size fractions are given for two pilot plant spray-drier runs made with and without the agent. In both runs, 27% of the whole catalyst product passed through a 200-mesh screen.

The run with the added agent resulted in a higher salt concentration for both the coarse and fine fractions. A characterizing feature of this invention is the greater uniformity of salt distribution throughout the range of particle sizes, as indicated by the smaller difference in $SO_3/K_2O$ mole ratio between the coarse and fine fraction for the run with the agent compared to the run without the agent. Thus the difference in $SO_3/K_2O$ mole ratio between the coarse and fine fractions (as separated by a 200-mesh screen) is less than 15% and preferably less than 10%.

TABLE I

|  | Coarse (+200 mesh) fraction | | | Fine (−200 mesh) fraction | | |
|---|---|---|---|---|---|---|
|  | Percent | | $SO_3/K_2O$ mole ratio | Percent | | $SO_3/K_2O$ mole ratio |
|  | $K_2O$ | $SO_3$ |  | $K_2O$ | $SO_3$ |  |
| No Agent | 7.8 | 10.0 | 1.51 | 11.1 | 16.3 | 1.72 |
| 0.5% agent | 9.0 | 11.1 | 1.62 | 12.8 | 18.7 | 1.71 |

Example 3

Comparisons of 5,000 pound lots of catalyst, made on a production scale, with and without the polyacrylamide flocculating agent, are given in Table II. In the run with the added agent the salt in the catalyst is more evenly distributed between the coarse and fine fractions. The difference between the coarse and fine fractions for the calcined catalyst as compared with the calcined whole catalyst is less than 10% with the added agent and over 25% without the added agent. Furthermore, less salt is lost in drying the catalyst with the added agent. Note that in the run with the added agent, a higher solids content of 35% was possible; this results in economies in handling smaller amounts of slurry for the same catalyst yield compared to handling difficulties for slurries with lower solids content.

TABLE II

|  | No agent—feed solids 30% | | | | | 0.5% agent—feed solids 35% | | | | |
|---|---|---|---|---|---|---|---|---|---|---|
|  | Calcined whole catalyst (percent −200 mesh=38) | Spray-dried catalyst | | Calcined catalyst | | Calcined whole catalyst (percent −200 mesh=40) | Spray-dried catalyst | | Calcined catalyst | |
|  |  | +200 | −200 | +200 | −200 |  | +200 | −200 | +200 | −200 |
| Percent $V_2O_5$ | 6.6 | 7.5 | 6.5 | 7.1 | 6.2 | 6.4 | 6.3 | 5.7 | 7.4 | 6.1 |
| Percent $K_2O$ | 10.1 | 8.5 | 20.0 | 7.3 | 13.7 | 9.2 | 8.8 | 10.9 | 9.2 | 10.3 |
| Percent $SO_2$ | 17.0 | 15.2 | 28.8 | 15.3 | 23.0 | 16.1 | 16.1 | 20.9 | 14.7 | 17.8 |
| Mol ratio $SO_2/K_3O$ | 1.98 | 2.1 | 1.7 | 2.5 | 2.0 | 2.1 | 2.2 | 2.3 | 1.9 | 2.0 |

Table III, below, indicates the conversion of naphthalene feed to phthalic anhydride (PAA) and to the by-products maleic anhydride (MAA) and the naphthoquinone (NQ) by the use of the catalysts of Table II. The catalyst with the added agent resulted in higher initial yields of phthalic anhydride and retained its activity for a significantly longer period than the catalyst without the agent. Conversion is given in lb./100 lb. naphthalene feed on calcined whole catalyst.

TABLE III

|  | No agent | | 0.5% agent | |
|---|---|---|---|---|
| Days on test | 3 | 7 | 3 | 10 |
| To PAA | 89 | (1) | 99 | 102 |
| To MAA | 3.1 |  |  |  |
| To NQ | 3.4 | (2) | 0.8 | 0.7 |
| Optimum reaction temperature ° C | 357 | 380 | 354 | 358 |

[1] Very low.
[2] Very high.

Example 4

In spray-drying the slurry of xerogel and salt solution of this invention, it was found that the breakup of gel particles could be avoided by controlling the atomizing speed and the peripheral speed below a critical value. The particle size of material sprayed from a common feed batch in a pilot plant spray drier is given below (initial silica gel size 27% −200 mesh).

TABLE IV

| | Atomizer diameter, inches | Peripheral speed, f.p.m. | Product size; percent −200 mesh |
|---|---|---|---|
| Atomizer speed, r.p.m.: | | | |
| 4,000 | 6 | 6,300 | 27 |
| 8,000 | 3.5 | 7,300 | 23 |
| 8,000 | 6 | 12,500 | 27 |
| 12,000 | 6 | 18,800 | 42 |

Data for a plant-scale operation are presented below for the production of the catalyst of this invention.

TABLE V

| Silica gel feed mesh size (Cum.) | | | Atomizer speed, r.p.m. | Atomizer diameter, inches | Peripheral speed, f.p.m. | Product mesh size (Cum.) | | |
|---|---|---|---|---|---|---|---|---|
| 100 | 200 | 325 | | | | −100 | 200 | 325 |
| Percent | | | | | | Percent | | |
| 99 | 42 | 15 | 3,600 | 8 | 7,500 | 98 | 45 | 20 |
| 88 | 37 | 14 | 5,600 | 6 | 13,600 | 93 | 52 | 31 |

This invention has been described in terms of specific embodiments set forth in detail, but it should be understood that these are by way of illustration only and that the invention is not necessarily limited thereto. Alternative embodiments will become apparent to those skilled in the art in view of this disclosure, and accordingly, modifications of the processes and compositions disclosed herein are to be contemplated within the spirit of this invention.

We claim:

1. In the preparation of a catalyst for the oxidation of naphthalene to phthalic anhydride from a slurry comprising a silica gel, a vanadium oxide and a potassium sulfate, the improvement which comprises including in said slurry from about 0.1 to about 2%, based on the catalyst solids in said slurry, organic flocculating agent.

2. The process of claim 1 wherein said agent is a polyacrylamide.

3. The process of claim 1 wherein said slurry contains approximately 35–40% solids content.

4. The process of claim 1 wherein said slurry is spray-dried from an atomizer at an atomizer speed below 12,000 r.p.m. and a peripheral speed below 18,800 f.p.m.

References Cited

UNITED STATES PATENTS

| 2,831,841 | 4/1958 | Jones. |
| 2,973,371 | 2/1961 | Chomitz et al. |
| 3,249,538 | 5/1966 | Freier _____ 25—18 |
| 3,296,235 | 1/1967 | Zoebelein. |

PATRICK P. GARVIN, Primary Examiner

U.S. Cl. X.R.

252—440; 260—346.4

PO-1050
(5/69)

UNITED STATES PATENT OFFICE
CERTIFICATE OF CORRECTION

Patent No. 3,507,810          Dated April 21, 1970

Inventor(s) WILLIAM EUGENE SANBORN and JOHN FRANCIS LINDSLEY

It is certified that error appears in the above-identified patent and that said Letters Patent are hereby corrected as shown below:

Column 3, Table II, "Percent $SO_2$" should read --Percent $SO_3$--, and "Mol ratio $SO_2/K_3O$" should read --Mol ratio $SO_3/K_2O$--.

Column 4, Table II, under "0.5% agent--feed solids 35," "Calcined catalyst," at "—200", the "6.1" value should read --6.3--, the "10.3" value should read --10.0--, and the "2.0" value should read --2.1--.

SIGNED AND
SEALED
SEP 15 1970

(SEAL)
Attest:

Edward M. Fletcher, Jr.
Attesting Officer

WILLIAM E. SCHUYLER, JR.
Commissioner of Patents